(12) United States Patent
Couch et al.

(10) Patent No.: X961
(45) Date of Patent: Dec. 10, 1808

(54) NAILS,CUTTING,ROLLING &PLATING/NAIL MAC

(76) Inventors: Stephen Couch; Asa Towne

[illegible] Couch and [illegible] [illegible]
Letters Patent. Issued December 10, [illegible]
The Schedule [illegible] to [illegible] Letters Patent making
part of the same containing a description in the [illegible] [illegible]
Stephen Couch & Asa Towne [illegible] [illegible] [illegible] for
rolling & plating iron & cutting Nails. —

The dimensions of the following may be varied. The frame [illegible]
the rollers to be made of cast iron, the rollers to be from 14
to 18 inches in length betwixt the frame & from 18 to 24
inches in circumference to be made with iron & steel to be
turned [illegible] & [illegible] [illegible] [illegible] [illegible] [illegible] to raise
the head of the nails on the edges before it passes into the
Cutters, which ought to be varied for nails & brads of any size.
The water wheel for cutting to be from 4 to 6 feet [illegible] [illegible]
as the head & fall of the water may require, the shaft to be
from [illegible] feet to 3½ in diameter, as the sizes of nails & brads
may require in Diameter & from 10 to 20 feet in length [illegible] [illegible]
on turned Gudgeons [illegible] cast boxes the shaft to be exactly
round with as many bands on the shaft as [illegible] [illegible] sizes of
nails & each band to be turned on the shaft, [illegible] band to
have a dye put in with a dovetail & keyed from 6 to 12
inches between according to the sizes of the nails [illegible] [illegible]
so as to head & point every other nail opposite ways.
There have a [illegible] [illegible] [illegible] [illegible] [illegible] 4 by 6 inches [illegible]
as far in length on the shaft as the quantity of [illegible] [illegible]
or for different sizes of nails & brads. — [illegible] [illegible] [illegible]
to the Cutters by vibration of the same within [illegible] [illegible] the
vibration occasioned by water or a weight. —

Stephen Couch
Asa Towne

Witnesses { Daniel Towne
Oliver Towne